United States Patent Office 3,451,218
Patented June 24, 1969

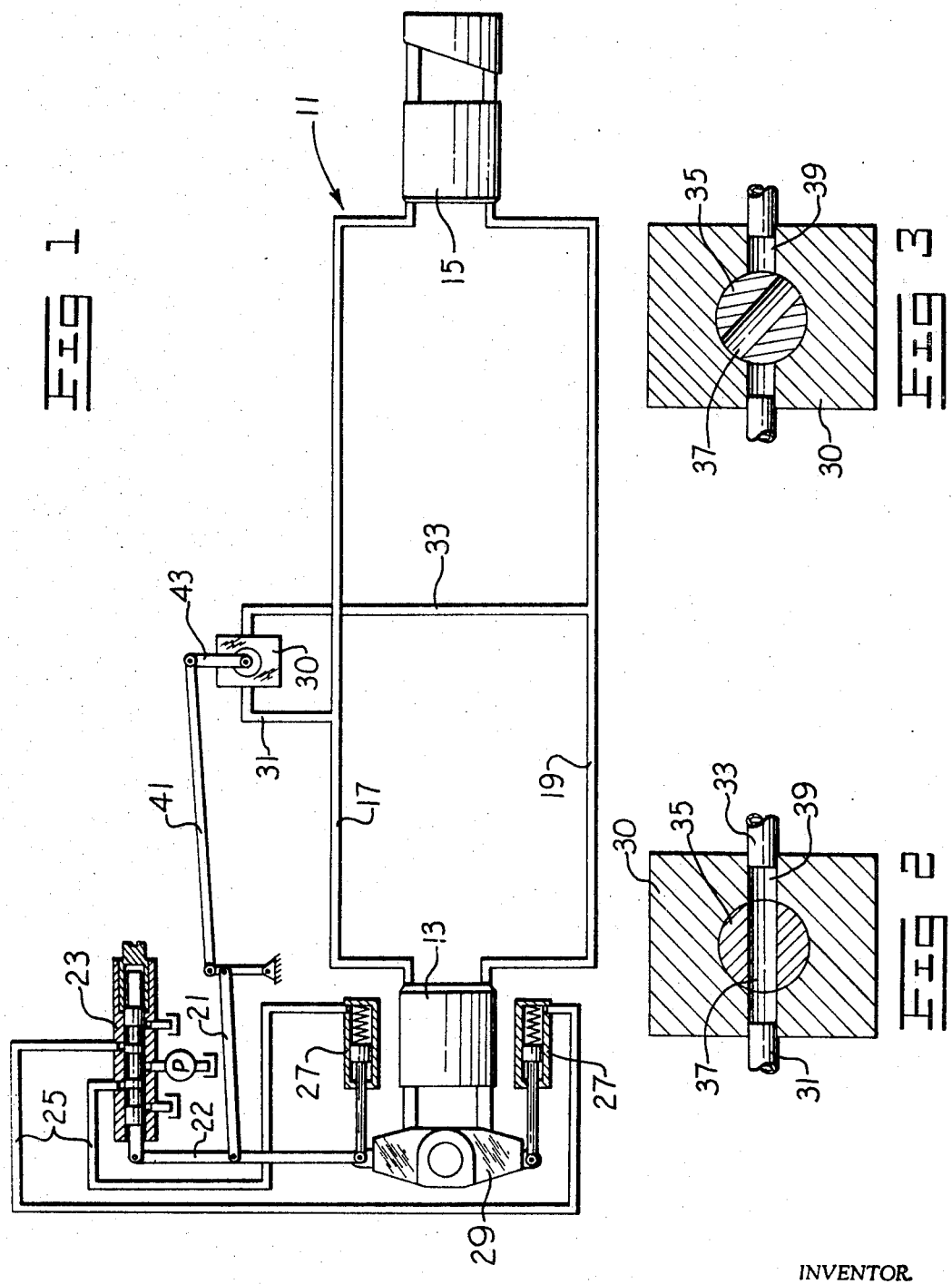

3,451,218
COMPENSATOR VALVE FOR HYDROSTATIC TRANSMISSION
Arthur F. Grant, East Cleveland, Ohio, assignor, by mesne assignments, to Towmotor Corporation, a corporation of Ohio
Filed Sept. 1, 1967, Ser. No. 665,076
Int. Cl. F16h *39/46*
U.S. Cl. 60—52                                   3 Claims

ABSTRACT OF THE DISCLOSURE

In hydrostatic transmission wherein power flow is transmitted by fluid pressure between pump and motor units connected in a fluid loop, roughness of the transmission may be avoided during changes in pump displacement by incorporating a variable compensator valve in the loop which bleeds pressurized fluid from the high pressure side of the loop to the low pressure side of the loop in certain pump displacement ranges, thereby smoothing transmission operation.

BACKGROUND OF THE INVENTION

Hydrostatic transmissions are particularly suitable for use in slow-moving type vehicles where precise control and close working quarters are encountered since they provide the operator of such a vehicle with an infinitely variable vehicle speed selection within its speed range. As a result, these types of transmission are becoming increasingly popular in lift trucks, loaders and the like.

Generally, these hydrostatic transmissions consist of a variable displacement pump unit driven by the engine of the vehicle and a motor unit connected to the drive train of the vehicle. A fluid loop composed of conduits is used to interconnect the pump and motor unit and the motor unit is generally of a fixed displacement or can alternatively be a variable displacement unit. In such a transmission, the motor speed will be zero when the displacement of the pump is zero and by increasing the fluid displacement of the pump it drives the motor in a direction consistent with the fluid flow direction. Since the displacement of the pump can be changed in two directions, the flow of pressure fluid through the loop may be in either direction, thereby giving the operator the full range of speed selection in both forward and reverse directions.

A hydrostatic transmission such as the one described above with associated complementary systems is shown in U.S. Patent 3,230,699, issued to Hann et al., and reference is made thereto for a disclosure for a complete hydrostatic transmission system of the type in which this invention may be employed.

In general, the operator controls the transmission by varying the swash plate angle of the pump and thereby changing the displacement of the pump to change the volume of fluid flow in the loop or its direction. During such control it should be appreciated that when the vehicle is being slowed down by the operator retarding the speed control lever, the inertia of the vehicle drives the motor and it acts as a pump driving the pump connected with the vehicle engine providing compression braking.

In hydrostatic transmissions there are abrupt pressure changes in the loop, as the pump displacement is moved toward zero displacement with the vehicle in motion or moves away from a zero displacement when the vehicle is starting up. Several factors cause the abrupt pressure changes, one of which is the reversal of power flow or the initiation of such flow and another contribution factor is the control system moving the swash plate of the pump to a new displacement position which requires considerable force which often causes its movement to be irregular. Further there is always the shock wave surge produced by the valving pump plate as the piston cylinders come in communication with the ports in the valve plate.

The effects of these factors are more pronounced at low pump displacements when the vehicle is traveling at low speed, and, of course, in this situation, since the volume of the fluid flow is small, the effect is magnified. In fact, vehicle oscillation may resonate with the pressure surge pattern in the loop, complicating the situation further.

SUMMARY OF THE INVENTION

The roughness experienced at low speed in hydrostatic transmission can be reduced by including a compensator valve between the two sides of the hydrostatic loop and connecting the valve with the control system for the transmission or the pump swash plate, so that the compensator valve will be partially open at small pump displacements whereby hydrostatic fluid may pass from the high pressure side to low pressure side of the loop, bypassing the pump or motor to reduce the pressure surges in the transmission during deceleration and acceleration of the vehicle in low speed ranges.

BRIEF DESCRIPTION OF THE DRAWING

The invention will be better understood by referring to the following drawings in conjunction with the specification wherein:

FIG. 1 is a schematic view of the basic elements of a hydrostatic transmission with the compensator valve connected between the two sides of the loop;

FIG. 2 is a cross-section of the compensator valve in a neutral position; and

FIG. 3 is a similar cross-section of the compensator valve in a closed position.

DESCRIPTION OF A PREFERRED EMBODIMENT

Referring to the drawings, FIG. 1 shows a hydrostatic transmission 11 which includes a variable displacement pump 13 and a fixed displacement motor 15 connected in a fluid loop composed of conduits 17 and 19. The speed of the transmission is controlled by varying the displacement of the pump but the displacement of the motor can likewise be controlled for higher speed operation, should this be desired. Normally, at low speed conditions the motor will be at maximum displacement in order to provide the greatest torque. Control linkage 21 activated by suitable operator control devices (not shown) such as a lever or pedal, is used to control the displacement of the pump.

In the control linkage shown, a member 22 is connected between valve 23 and the swash plate of the pump which acts as a follow-up linkage positioning valve 23 "neutral" when the swash plate has moved to the position corresponding to that selected by the operator's control device.

Thus, movement of the control linkage causes the spool in valve 23 to be displaced, which directs pressurized hydraulic fluid to suitable lines 25 to the pump control cylinders 27 for controlling the displacement of the pump by changing the angle of the swash plate 29.

Arranged in the above manner, as the pump is driven by an appropriate power source and the fluid displaced is circulated through conduits 17 and 19 to the motor and where the fluid passing through the motor drives it proportionally to the volume output of the pump. In any operable hydrostatic transmission there is also included suitable pressure relief valves, replenishing valves and shuttle valves which are not shown or described since they are not pertinent to the invention and constitute well-known features in the art.

According to this invention a compensator valve 30 is connected between conduits 17 and 19 so that it is connected parallel with the pump and motor in the loop and capable of controlling the flow of pressurized fluid between these conduits independently of that passing through either the pump or motor units.

In the drawings this compensator valve is illustrated as a rotary spool type having a spool 35 with an aperture 37 which registers with a bore 39 in the valve body to allow fluid to pass through the valve. Thus, as shown in FIG. 3, when an aperture and bore are not registered there is no fluid passage through the valve and it can be appreciated as the valve is rotated it will move from a full closed to a full open with a metering action in between these two extremes. Any other suitable valve which provides such variable flow control could also be employed. Basically, the compensator valve is employed only at low transmission speeds in order to reduce the pressure surges in the hydrostatic loop (conduits 17 and 19) by venting some of the pressure from the high pressure side of the loop to the low pressure side, as more fully explained hereafter. At higher speeds this compensator valve is completely closed and allows the transmission to operate at full efficiency without any loss of power.

In the embodiment shown in FIG. 1 the compensator valve is associated by the control linkage 21 through link 41 and an arm 43 which controls the relative position of the bore and aperture in the compensator valve. Normally, the compensator valve is open when the pump is at zero displacement and as the control linkage is actuated it will begin the close the compensator valve as displacement of the pump increases. Usually, after the control linkage has moved to a position representing half of full pump displacement in either direction the compensator valve will be fully closed.

At low speed operation the pump displacement will be relatively small per revolution of the pump and the pressure surges relatively high. Since when this occurs the compensator valve is at least partially open these pressure surges will be partially vented directly to the low pressure side of the hydrostatic loop eliminating the jerky response of the motor. Naturally, by-passing some of the fluid around the motor will reduce the efficiency of the transmission but since only low speed operation is desired this reduction in efficiency is tolerable in terms of improved transmission response and ability to "inch" the vehicle forwards or backwards.

While the above description has been related to the increase from zero displacement toward a positive displacement of the pump it should also be appreciated that the compensator valve is equally as effective during slow-down of a vehicle utilizing a hydrostatic transmission. When deceleration is desired and the operator retards the control linkage and the motor is driven by the vehicle drive train by the vehicle inertia which directs fluid flow to the pump. As the pump moves toward its zero displacement there will be less volume to assimilate the flow from the motor but the compensator valve opening in the lower pump displacement ranges will allow some of this fluid flow from the motor to be vented directly to a low pressure side of the conduit thereby smoothing the gradual slow-down of the vehicle.

Obviously the amount of fluid flowing through the compensator valve can be controlled by sizing orifices or the like in order to achieve a desirable low speed response in the transmission.

While the compensator valve has been described with reference to a couple with the control linkage it could likewise be coupled directly with the swash plate of the pump, since its operation is tied to the pump displacement. Similarly, it could include linkages which cause it to operate intermittently when changes in pump or motor displacements occur.

The compensator valve will operate whether the transmission is operated in a forward or reverse mode since its rotation in either direction will close off the fluid passage between the conduits 17 and 19 after a predetermined degree of swash plate angular change. For this reason the rotary type compensator valve is useful however, other types of valves could be likewise employed. The simplicity of the compensator valve and its ability to operate in both the forward and reverse modes of the transmission drive provides a very simple and efficient means to reduce low speed roughness of hydrostatic transmission.

In actual practice it was found that use of the compensator valve greatly improved the operation of a hydrostatic transmission, especially when use in lift trucks wherein small inching movement is desired to align the load on the lift fork. Obviously such a desirable feature could likewise be employed on other similar type vehicles.

I claim:
1. In a low-speed hydrostatic transmission for lift trucks having a variable displacement fluid pump and a fluid motor connected in a fluid loop whereby power transfer therebetween is accomplished through the circulation of fluid, an improved low-speed compensator system for smoothing transmission operation comprising:
   valve means capable of metering fluid flow between its closed and open positions;
   conduit means connecting said valve means in said fluid loop in parallel with said variable displacement fluid pump and fluid motor; and
   linkage means connecting said valve means with elements controlling the displacement of said variable displacement pump whereby said valve means meters fluid flow in relation to pump displacement, said linkage means arranged to effect metered flow through said valve means inversely proportional to pump displacement between zero displacement and one-half of maximum pump displacement in either direction.

2. The low-speed compensator as defined in claim 1 wherein the linking means connects the valve means with the control levers controlling the displacement of the variable displacement fluid pump.

3. The low-speed compensator as defined in claim 1 wherein the linkage means connects the valve means with the swashplate of the variable displacement fluid pump.

References Cited
UNITED STATES PATENTS

| | | |
|---|---|---|
| 3,106,108 | 10/1963 | Thoma et al. |
| 3,161,137 | 12/1964 | Thoma et al. |
| 3,171,255 | 3/1965 | Lauck _____ 60—53 |
| 3,171,256 | 3/1965 | Lauck _____ 60—53 |

EDGAR W. GEOGHEGAN, *Primary Examiner.*

U.S. Cl. X.R.
60—53; 103—41